United States Patent
Saeki et al.

(10) Patent No.: US 12,436,476 B2
(45) Date of Patent: Oct. 7, 2025

(54) METHOD FOR PRODUCING PIGMENT DISPERSION, AND METHOD FOR PRODUCING TONER FOR DEVELOPING ELECTROSTATIC CHARGE IMAGES

(71) Applicant: FUJIFILM Business Innovation Corp., Tokyo (JP)

(72) Inventors: Yuta Saeki, Kanagawa (JP); Takeshi Tanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 592 days.

(21) Appl. No.: 17/903,503

(22) Filed: Sep. 6, 2022

(65) Prior Publication Data

US 2023/0266686 A1    Aug. 24, 2023

(30) Foreign Application Priority Data

Feb. 21, 2022  (JP) .................................. 2022-024960

(51) Int. Cl.
  *C09D 17/00*  (2006.01)
  *G03G 9/08*  (2006.01)

(52) U.S. Cl.
  CPC ......... *G03G 9/0804* (2013.01); *C09D 17/003* (2013.01)

(58) Field of Classification Search
  CPC ............... G03G 9/0802; G03G 9/0804; G03G 9/09392; C09D 17/003
  See application file for complete search history.

(56) References Cited

U.S. PATENT DOCUMENTS

2007/0178401 A1    8/2007  Kurokawa

FOREIGN PATENT DOCUMENTS

| JP | 11-352319 A | 12/1999 | | |
| JP | 2007-206286 A | 8/2007 | | |
| JP | 2008-156466 | * | 7/2008 | ............. C09B 67/46 |
| JP | 2012-212116 A | 11/2012 | | |
| JP | 2015-174876 | * | 10/2015 | ............. C09B 67/20 |

OTHER PUBLICATIONS

Translation of JP 2008-156466.*
Translation of JP 2015-174876.*

* cited by examiner

*Primary Examiner* — Peter L Vajda
(74) *Attorney, Agent, or Firm* — Sughrue Mion, PLLC

(57) ABSTRACT

A method for producing a pigment dispersion includes: wet-dispersing a mixture A containing an organic pigment, a flame retardant, a dispersant, and an aqueous medium by using a media disperser to form a mixture B; and wet-dispersing the mixture B by using a media disperser to form a mixture C. The media disperser in the wet-dispersing of the mixture A and the media disperser in the wet-dispersing of the mixture B are annular-type media dispersers each having a cylindrical vessel, a cylindrical rotor that is disposed inside the cylindrical vessel and that rotates to disperse the mixture, and a screen-type media separator that separates media particles and the mixture. The number-average particle size MA of the media particles in the media disperser in the wet-dispersing of the mixture A and the number-average particle size MB of the media particles in the media disperser in the wet-dispersing of the mixture B satisfy the following formula (1) and the following formula (2):

0.5 mm≥$MA$>$MB$≥0.05 mm,    Formula (1):

0.3 mm≥$MB$≥0.05 mm.    Formula (2):

11 Claims, 2 Drawing Sheets

FIG. 2

METHOD FOR PRODUCING PIGMENT DISPERSION, AND METHOD FOR PRODUCING TONER FOR DEVELOPING ELECTROSTATIC CHARGE IMAGES

CROSS-REFERENCE TO RELATED APPLICATIONS

This application is based on and claims priority under 35 USC 119 from Japanese Patent Application No. 2022-024960 filed Feb. 21, 2022.

BACKGROUND

(i) Technical Field

The present disclosure relates to a method for producing a pigment dispersion, and a method for producing a toner for developing electrostatic charge images.

(ii) Related Art

For example, Japanese Unexamined Patent Application Publication No. 11-352319 discloses a "method for producing a paste for color filters, the method including dispersing a colorant in multiple steps by using a media stirring-type disperser, wherein the diameter of the media in the steps is gradually reduced, and the colorant is dispersed by circulation".

Japanese Unexamined Patent Application Publication No. 2012-212116 discloses a "method for producing a color material for color filters, the color material containing a pigment, a pigment derivative, and a liquid medium, the method including a step (A) of dispersing a pigment composition containing a pigment, a pigment derivative, and a liquid medium by using media with a particle size of Ø 0.005 mm to Ø 0.05 mm in a vertical annular-type wet disperser including a rotor and a vessel and having a media separation mechanism by means of screenless centrifugation".

Japanese Unexamined Patent Application Publication No. 2007-206286 discloses a "method for producing a polymer toner including a step 1 of preparing a polymerizable monomer composition containing a polymerizable monomer and a colorant, a step 2 of dispersing the polymerizable monomer composition in an aqueous dispersion medium to form droplets, and a step 3 of polymerizing the droplets to form colorant resin particles, wherein the step 1 includes a dispersing step of dispersing the colorant in a mixture containing the polymerizable monomer and the colorant by supplying the mixture to a media-type disperser having media particles and a media separation screen".

SUMMARY

Aspects of non-limiting embodiments of the present disclosure relate to a method for producing a pigment dispersion, the method including a first step of wet-dispersing a mixture A containing an organic pigment, a flame retardant, a dispersant, and an aqueous medium by using a media disperser to form a mixture B, and a second step of wet-dispersing the mixture B by using a media disperser to form a mixture C. The media disperser in the first step and the media disperser in the second step are annular-type media dispersers each having a cylindrical vessel, a cylindrical rotor that is disposed inside the cylindrical vessel and that rotates to disperse the mixture, and a screen-type media separator that separates media particles and the mixture. In this method, the pigment may have high dispersibility, and the screen-type media separator of the media disperser may be prevented from being clogged with the flame retardant, compared with a method in which the number-average particle size MA of the media particles in the media disperser in the first step and the number-average particle size MB of the media particles in the media disperser in the second step do not satisfy the following formula (1) and the following formula (2).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a pigment dispersion including:
wet-dispersing a mixture A containing an organic pigment, a flame retardant, a dispersant, and an aqueous medium by using a media disperser to form a mixture B; and
wet-dispersing the mixture B by using a media disperser to form a mixture C,
wherein the media disperser in the wet-dispersing of the mixture A and the media disperser in the wet-dispersing of the mixture B are annular-type media dispersers each having a cylindrical vessel, a cylindrical rotor that is disposed inside the cylindrical vessel and that rotates to disperse the mixture, and a screen-type media separator that separates media particles and the mixture, and
the number-average particle size MA of the media particles in the media disperser in the wet-dispersing of the mixture A and the number-average particle size MB of the media particles in the media disperser in the wet-dispersing of the mixture B satisfy the following formula (1) and the following formula (2).

$$0.5 \text{ mm} \geq MA > MB \geq 0.05 \text{ mm} \qquad \text{Formula (1):}$$

$$0.3 \text{ mm} \geq MB \geq 0.05 \text{ mm} \qquad \text{Formula (2):}$$

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below. The following description and Examples are for illustrating the present disclosure, but are not intended to limit the present disclosure.

A value range expressed by using "to" in the present disclosure indicates a range including the values before and after "to" as the minimum value and the maximum value.

With regard to value ranges described stepwise in this specification, the upper limit or the lower limit of one value range may be replaced by the upper limit or the lower limit of another value range. The upper limit or lower limit of any value range described in the present disclosure may be replaced by a value described in Examples.

In this specification, the term "step" includes not only an independent step but also a step that cannot be clearly distinguished from other steps but may accomplish an intended purpose.

In the description of exemplary embodiments with reference to the drawings in this specification, the configurations of the exemplary embodiments are not limited to the configurations illustrated in the drawings. The sizes of members in each figure are schematic, and the relative relationship between the sizes of the members is not limited to what is illustrated.

In this specification, each component may include two or more corresponding substances. In the present disclosure, the amount of each component in a composition refers to, when there are two or more substances corresponding to each component in the composition, the total amount of the substances present in the composition, unless otherwise specified.

In this specification, the "toner for developing electrostatic charge images" is also referred to simply as a "toner".

Method for Producing Pigment Dispersion

A method for producing a pigment dispersion according to an exemplary embodiment includes a first step (hereinafter also referred to as a "first dispersing step") of wet-dispersing a mixture A containing an organic pigment, a flame retardant, a dispersant, and an aqueous medium by using a media disperser to form a mixture B, and a second step (hereinafter also referred to as a "second dispersing step") of wet-dispersing the mixture B by using a media disperser to form a mixture C.

The media disperser in the first dispersing step and the media disperser in the second dispersing step are annular-type media dispersers each having a cylindrical vessel, a cylindrical rotor that is disposed inside the cylindrical vessel and that rotates to disperse the mixture, and a screen-type media separator that separates media particles and the mixture.

The number-average particle size MA of the media particles in the media disperser in the first dispersing step and the number-average particle size MB of the media particles in the media disperser in the second dispersing step satisfy the following formula (1) and the following formula (2).

$$0.5 \text{ mm} \geq MA > MB \geq 0.05 \text{ mm} \quad \text{Formula (1):}$$

$$0.3 \text{ mm} \geq MB \geq 0.05 \text{ mm} \quad \text{Formula (2):}$$

In the method for producing a pigment dispersion according to the exemplary embodiment having the above features, the pigment may have high dispersibility, and the screen-type media separator of the media disperser may be prevented from being clogged with the flame retardant. The reason for this is assumed as described below.

To improve color forming of pigments in toner production, the pigments need to be micronized to a particle size in the region of 0.5 μm or less before the pigments are dispersed.

In the related art, there is known a method for producing a pigment dispersion by micronizing a pigment, wherein the method involves performing stirring and mixing in a media disperser to crush and pulverize the pigment by means of, for example, shearing force, frictional force, and impact force of collision between media particles.

It is known that pigments can be more micronized by using media particles having smaller sizes in order to disperse pigments with a particle size in a region of 0.5 μm or less in a media disperser. There is also known a method in which the media diameter is sequentially reduced in multiple steps in a media disperser in order to efficiently micronize pigments (e.g., Japanese Unexamined Patent Application Publication No. 11-352319).

Examples of the media disperser for micronizing pigments include an annular-type media disperser having a cylindrical vessel and a cylindrical rotor that is disposed inside the cylindrical vessel and that rotates to disperse the mixture (e.g., Japanese Unexamined Patent Application Publication No. 2012-212116). The annular-type media disperser includes media particles between the cylindrical vessel and the cylindrical rotor and produces a strong shear action of the media particles through rotation of the cylindrical rotor to efficiently crush and pulverize the pigment.

The annular-type media disperser uses centrifugation as a separation mechanism for efficiently separating the media particles and the pigment dispersion. However, many organic pigments contain a flame retardant in order to improve flame-resistance. Of flame retardants, metal oxides are not separated by the media separation mechanism and mixed into the pigment dispersion to degrade the image quality and charging characteristics of toner.

In the related art, a method for producing a pigment dispersion by using a screen-type media separation mechanism is proposed (e.g., Japanese Unexamined Patent Application Publication No. 2007-206286).

A pigment (particularly organic pigment) used as a material contains a flame retardant for preventing combustion. The mixture A used as a material of the pigment dispersion thus contains a flame retardant.

However, the flame retardant clogs the screen and degrades continuous processing of the disperser.

In the method for producing a pigment dispersion, a mixture containing an organic pigment, a flame retardant, a dispersant, and an aqueous medium is wet-dispersed in an annular-type media disperser having a screen-type media separator in multiple steps (first dispersing step and second dispersing step).

The number-average particle size MA of the media particles in the media disperser in the first dispersing step and the number-average particle size MB of the media particles in the media disperser in the second dispersing step satisfy the above formula (1) and the above formula (2). In other words, the media particles of both the media disperser in the first dispersing step and the media disperser in the second dispersing step are reduced in particle size, and the media particles of the media disperser in the first dispersing step are larger than those of the media disperser in the second dispersing step.

When the media particles of both the media disperser in the first dispersing step and the media disperser in the second dispersing step are reduced in particle size, the pigment may be efficiently crushed and pulverized by producing a strong shear action of the media particles in both the media disperser in the first dispersing step and the media disperser in the second dispersing step, compared with the related art.

In addition, when the media particles of the media disperser in the first dispersing step are larger than those of the media disperser in the second dispersing step, the flame retardant may be stepwisely captured according to the particle size in the first dispersing step and the second dispersing step to prevent clogging.

From the foregoing, the pigment may have high dispersibility, and the screen-type media separator of the media disperser may be prevented from being clogged with the flame retardant in the method for producing a pigment dispersion according to the exemplary embodiment.

In the method for producing a pigment dispersion according to the exemplary embodiment, the screen-type media separator of the media disperser may be prevented from being clogged with the flame retardant, and the annular-type media disperser may thus show high continuous processing.

In the method for producing a pigment dispersion according to the exemplary embodiment, the flame retardant can be removed by using the screen-type media separator.

The method for producing a pigment dispersion according to the exemplary embodiment will be described below in detail.

First, a production apparatus (hereinafter also referred to as a "pigment dispersion production apparatus") used in the method for producing a pigment dispersion according to the exemplary embodiment will be described.

Figure 1:
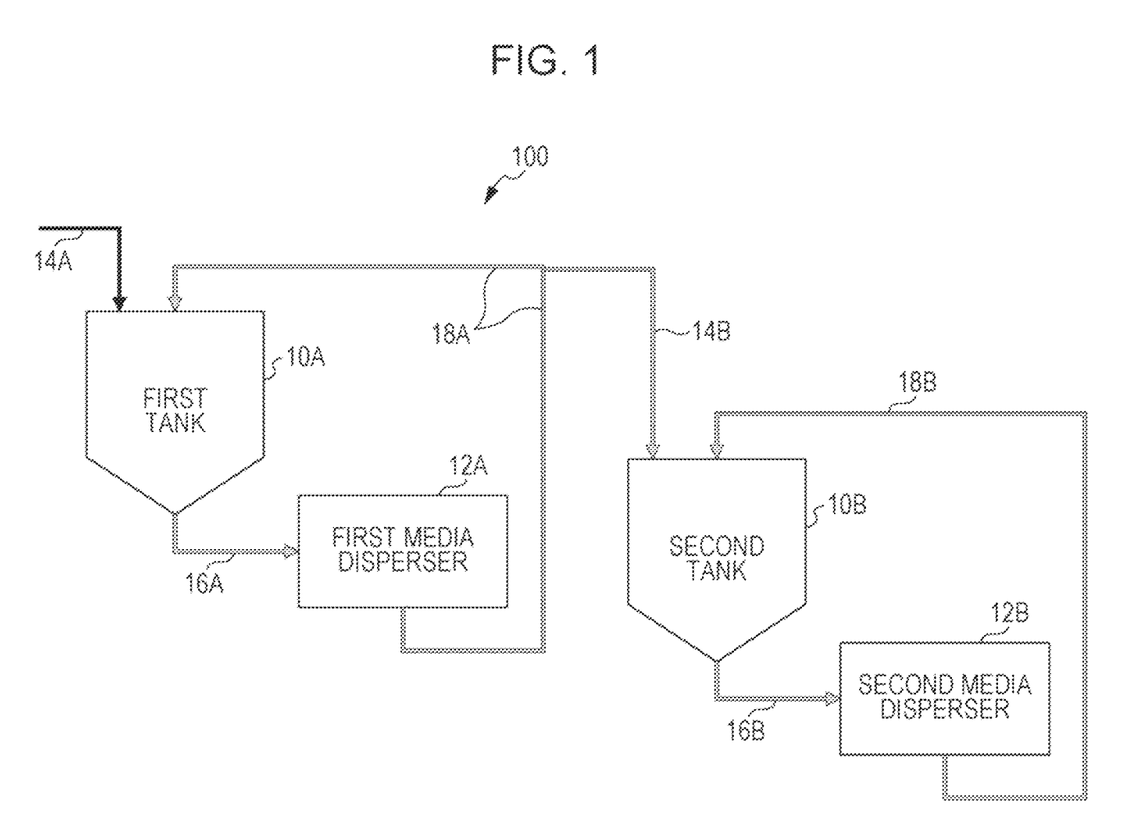
FIG. 1 is a schematic view of an example of a production apparatus used in a method for producing a pigment dispersion according to an exemplary embodiment.

Referring to FIG. 1, a pigment dispersion production apparatus 100 includes, for example, a first tank 10A, a first media disperser 12A, a second tank 10B, and a second media disperser 12B.

A feed pipe 14A is connected to the first tank 10A. A mixture A containing an organic pigment, a flame retardant, a dispersant, and an aqueous medium is fed to the first tank 10A through the feed pipe 14A.

A first feed pipe 16A is connected to the first tank 10A and the first media disperser 12A. The mixture A is fed to the first media disperser 12A from the first tank 10A through the first feed pipe 16A. A first discharge pipe 18A is connected to the first tank 10A and the first media disperser 12A. The mixture A dispersed by the first media disperser 12A is discharged into the first tank 10A through the first discharge pipe 18A.

A feed pipe 14B is connected to the second tank 10B. The feed pipe 14B diverges from the path of the first discharge pipe 18A. The mixture B obtained by circulating and dispersing the mixture A in the first media disperser 12A is fed to the second tank 10B.

A second feed pipe 16B is connected to the second tank 10B and the second media disperser 12B. The mixture B is fed to the second media disperser 12B from the second tank 10B through the second feed pipe 16B. A second discharge pipe 18B is connected to the second tank 10B and the second media disperser 12B. The mixture B dispersed by the second media disperser 12B is discharged into the second tank 10B through the second discharge pipe 18B.

Figure 2:
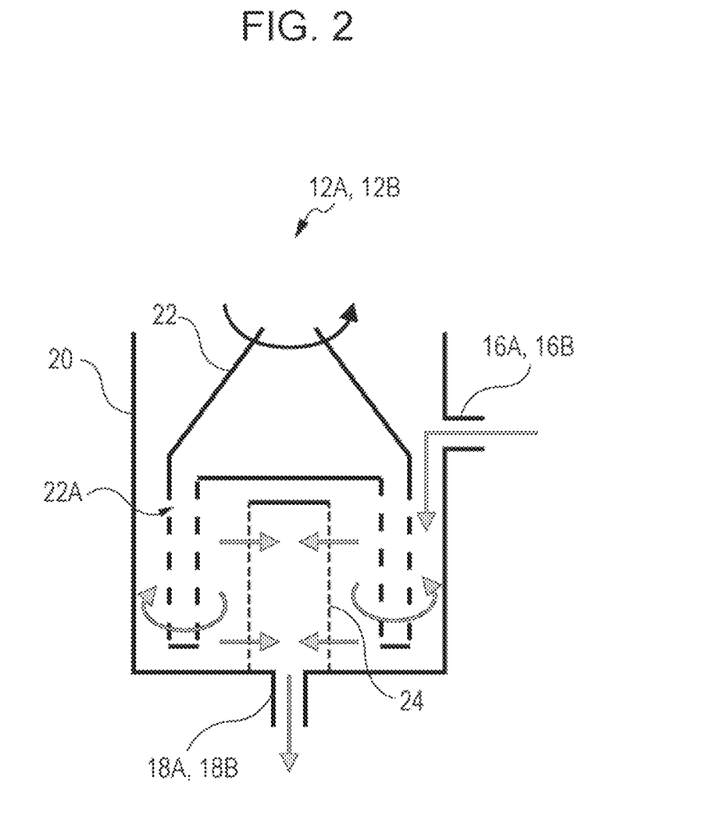
FIG. 2 is a schematic view of an example of an annular-type media disperser used in a first step and a second step in the method for producing a pigment dispersion according to the exemplary embodiment.

Next, the first media disperser 12A and the second media disperser 12B will be described. Since the first media disperser 12A and the second media disperser 12B have the same structure, they may be collectively referred to as the first and second media dispersers 12A and 12B. The same components are assigned with the same reference signs.

The first and second media dispersers 12A and 12B illustrated in FIG. 2 are, for example, annular-type media dispersers each having a cylindrical vessel 20, a cylindrical rotor 22 that is disposed inside the cylindrical vessel 20 and that rotates to disperse the mixture, and a screen-type media separator 24 that separates media particles and the mixture.

In FIG. 2, the reference signs 16A and 16B represent the first and second feed pipes 16A and 16B through which the mixtures A and B are fed to the first and second media dispersers 12A and 12B from the first and second tanks 10A and 10B. The reference signs 18A and 18B represent the first and second discharge pipes 18A and 18B through which the mixtures A and B dispersed by the first and second media dispersers 12A and 12B are discharged into the first and second tanks 10A and 10B.

Next, an example of each step in the method for producing a pigment dispersion according to the exemplary embodiment will be described.

The method for producing a pigment dispersion according to the exemplary embodiment includes the first dispersing step and the second dispersing step.

The first dispersing step involves wet-dispersing a mixture A containing an organic pigment, a flame retardant, a dispersant, and an aqueous medium by using the first media disperser 12A to form a mixture B.

The second dispersing step involves wet-dispersing the mixture B by using the second media disperser 12B to form a mixture C.

Specifically, for example, the mixture is dispersed as described below in the first dispersing step and the second dispersing step.

In the pigment dispersion production apparatus 100 illustrated in FIG. 1, the mixture A containing an organic pigment, a flame retardant, a dispersant, and an aqueous medium is fed to the first tank 10A through the feed pipe 14A.

The mixture A is fed to the first media disperser 12A from the first tank 10A through the first feed pipe 16A and dispersed by the first media disperser 12A. The mixture A dispersed by the first media disperser 12A is returned to the first tank 10A through the first discharge pipe 18A, again passes through the first feed pipe 16A, and is circulated and dispersed in the first media disperser 12A.

In the pigment dispersion production apparatus 100, the mixture B is fed to the second tank 10B through the feed pipe 14B.

The mixture B is fed to the second media disperser 12B from the second tank 10B through the second feed pipe 16B and dispersed by the second media disperser 12B. The mixture B dispersed by the second media disperser 12B is returned to the second tank 10B through the second discharge pipe 18B, again passes through the second feed pipe 16B, and is circulated and dispersed in the second media disperser 12B.

The mixture C is formed by circulating and dispersing the mixture B in the first media disperser 12A.

In the first and second media dispersers 12A and 12B illustrated in FIG. 2, media particles (not shown) are placed between the cylindrical vessel 20 and the cylindrical rotor 22 during feeding of the mixture. The rotation of the cylindrical rotor 22 produces a strong shear action of the media particles so that the pigment is micronized and dispersed by crushing and pulverization. The media particles and the mixture are then separated in the screen-type media separator 24.

In the method for producing a pigment dispersion according to the exemplary embodiment, for example, the dispersing of the mixture A containing an organic pigment composed of aggregates of primary particles having a volume-average particle size of 50 nm or more and 200 nm or less and a flame retardant having a volume-average particle size of 50 µm or more and 1000 µm or less may prevent the screen-type media separator of the media disperser from being clogged with the flame retardant and may provide a pigment dispersion in which the organic pigment has a volume-average particle size (i.e., dispersion size) of 50 nm or more and 300 nm or less and has high dispersibility. In addition, the flame retardant removability is high.

The volume-average particle sizes of the organic pigment and the flame retardant are measured as described below.

The particle size at 50% cumulative volume from the smallest particle size in the volume-based particle size distribution is measured 5 times by measuring the particle size using a laser diffraction/scattering particle size distribution analyzer (e.g., Microtrac MT3000II available from MicrotracBEL Corporation).

The average value of three particle sizes excluding the maximum value and the minimum value of the obtained particle sizes at 50% cumulative volume is defined as a volume-average particle size D50v.

Next, the first and second media dispersers 12A and 12B in the method for producing a pigment dispersion according to the exemplary embodiment will be described in detail.

The number-average particle size MA of the media particles in the first media disperser 12A and the number-average particle size MB of the media particles in the second media disperser 12B satisfy the following formula (1) and the following formula (2). By using such media particles, the pigment may be micronized to improve dispersibility. In addition, the screen-type media separator of the media disperser may be prevented from being clogged with the flame retardant. Moreover, the annular-type media disperser may show high continuous processing. Furthermore, the flame retardant removability may be improved.

From these points of view, the number-average particle size MA of the media particles and the number-average particle size MB of the media particles may satisfy the following formula (11) and the following formula (21).

$0.5 \text{ mm} \geq MA > MB \geq 0.05 \text{ mm}$ Formula (1):

$0.3 \text{ mm} \geq MB \geq 0.05 \text{ mm}$ Formula (2):

$0.4 \text{ mm} \geq MA > MB \geq 0.1 \text{ mm}$ Formula (11):

$0.2 \text{ mm} \geq MB \geq 0.1 \text{ mm}$ Formula (21):

The number-average particle size MA of the media particles in the first media disperser 12A and the number-average particle size MB of the media particles in the second media disperser 12B preferably satisfy the following formula (3), more preferably satisfy the following formula (31).

When the number-average particle size MA of the media particles and the number-average particle size MB of the media particles satisfy the following formula (3) or the following formula (31), there is a distinct difference in particle size between the media particles in the first media disperser 12A and the media particles in the second media disperser 12B, and the flame retardant may be captured stepwise according to the particle size in the first and second dispersing steps to prevent clogging. This feature may increase the dispersibility of the pigment and may improve the effect of preventing the screen-type media separator 24 from being clogged with the flame retardant. Moreover, the annular-type media disperser may show higher continuous processing. Furthermore, the flame retardant removability may be improved.

$0.45 \text{ mm} \geq MA - MB \geq 0.05 \text{ mm}$ Formula (3):

$0.3 \text{ mm} \geq MA - MB \geq 0.1 \text{ mm}$ Formula (31):

The number-average particle size of the media particles is measured as described below.

One hundred media particles are observed with a scanning electron microscope (SEM), and the equivalent circular diameter of each particle is determined by image analysis of the media particles. The 50% diameter (D50p) in the number-based cumulative frequency of the obtained equivalent circular diameter is defined as the number-average particle size of the media particles.

The inner diameter BD of the cylindrical vessel 20 and the outer diameter RD of the cylindrical rotor 22 preferably satisfy the following formula (4), more preferably satisfy the following formula (41).

When the inner diameter BD of the cylindrical vessel 20 and the outer diameter RD of the cylindrical rotor 22 satisfy the following formula (4) or the following formula (41), the cylindrical vessel 20 may be spaced apart from the cylindrical rotor 22 at an appropriate distance, and the amount of the circulating mixture may be regulated while the shear action of the media particles may be increased to improve the dispersibility of the pigment.

$1.50 \geq BD/RD \geq 1.05$ Formula (4):

$1.30 \geq BD/RD \geq 1.07$ Formula (41):

The cylindrical rotor 22 has a slit 22A through which the media particles move between the inside and outside of the cylindrical rotor 22. The cylindrical rotor 22 may have multiple slits circumferentially arranged in the axial direction of the cylindrical rotor 22. The rotation of the cylindrical rotor 22 causes the media particles to circulate and move between the inside and outside of the cylindrical rotor 22 to improve the dispersibility of the pigment.

The wall surface of the cylindrical rotor 22 may have a protrusion. When the cylindrical rotor 22 rotates, the protrusion may increase the shear action of the media particles to improve the dispersibility of the pigment.

The peripheral speed of the cylindrical rotor 22 is preferably 9 m/s or higher and 20 m/s or lower, more preferably 11 m/s or higher and 17 m/s or lower.

When the peripheral speed of the cylindrical rotor is in the above range, the shear action of the media particles may be increased to improve the dispersibility of the pigment.

The screen-type media separator 24 is, for example, a cylindrical metal mesh filter. The screen-type media separator 24 is not limited to the above filter, but preferably a mesh filter composed of wedge wire or notch wire from the viewpoint of strength and durability.

With regard to the mesh size of the screen-type media separator 24, the ratio of the mesh size to the number-average particle size of the media particles in the first and second media dispersers 12A and 12B is preferably ⅓ or more and ½ or less, more preferably 1/2.5 or more and ½ or less.

When the mesh size of the screen-type media separator 24 is in the above range, the mixture may be separated from the media particles while the screen has a wide opening area. This configuration may increase the effect of preventing the screen-type media separator 24 from being clogged with the flame retardant. Moreover, the media disperser may show higher continuous processing. Furthermore, the flame retardant removability may be improved.

The mesh size of the screen-type media separator 24 is preferably 20 μm or more and 250 μm or less, more preferably 30 μm or more and 200 μm or less.

The screen-type media separator 24 is, for example, disposed inside the cylindrical rotor 22. This configuration may prevent the media to press against the screen under centrifugal force and may prevent clogging of the screen-type media separator 24, compared with the case where the screen-type media separator 24 is disposed outside the cylindrical rotor 22. Moreover, the media disperser may show high continuous processing.

The first and second media dispersers 12A and 12B are, for example, dispersers that circulate the mixture to form a dispersion.

When the effective volume of the first and second media dispersers 12A and 12B is represented by V, the volume of the mixture dispersed by the first and second media dispersers 12A and 12B is represented by v, and the operation time is represented by t, the residence time RT (=V/v×t) during which the mixture resides in the first and second media dispersers 12A and 12B is preferably 0.5 minutes or longer and 3 minutes or shorter, more preferably 0.7 minutes or longer and 2.5 minutes or shorter.

When the residence time TR is in the above range, the shear action of the media particles may sufficiently act on the pigment to improve the dispersibility of the pigment. In addition, this feature may prevent pressing of the flame retardant against the screen caused by an increase in residence time and may prevent the screen-type media separator 24 from being clogged with the flame retardant. Moreover, the media disperser may show high continuous processing.

The effective volume V (unit: L) represents the volume of a region in the media disperser in which the filled media contribute to dispersion of the mixture. The catalog value of the media disperser is employed as the effective volume V. The effective volume V is, for example, 0.5 or more and 10 or less.

The volume v (unit: L) of the mixture represents the total volume of the mixture circulated and dispersed in the media disperser. The volume v of the mixture is, for example, 10 L or more and 1500 L or less.

The operation time t is the time (unit: min) from the start of circulation-dispersing to the end of circulation-dispersing of the mixture in the media disperser.

The operation time t is, for example, 10 minutes or longer and 1500 minutes or shorter.

Next, the mixture A used as a material in the method for producing a pigment dispersion according to the exemplary embodiment will be described.

The mixture A contains an organic pigment, a flame retardant, a dispersant, and an aqueous medium. The mixture A may contain other additives.

In the pigment dispersion production apparatus 100, the mixture A formed by mixing components in advance may be fed to the first tank 10A, or the components of the mixture A may be separately fed to the first tank 10A.

Organic Pigment

Examples of the organic pigment include well-known pigments, such as chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate.

Flame Retardant

The flame retardant is a component mixed with the organic pigment in advance in order to prevent combustion of the organic pigment.

Examples of the flame retardant include metal hydroxides, phosphorus compounds such as red phosphorus, antimony compounds, and bromine compounds.

Among these, metal hydroxides may be used as the flame retardant. Metal oxides are hard and difficult to crush and pulverize. Even when the flame retardant is a metal oxide, the pigment may have high dispersibility, and the flame retardant removability may be improved while the screen-type media separator of the media disperser may be prevented from being clogged with the flame retardant.

A flame retardant that is soft and easy to crush and pulverize, such as red phosphorus, is excessively crushed and pulverized, and it is difficult to remove the flame retardant through a screen or the like after production of the pigment dispersion.

Dispersant

Examples of the dispersant include anionic surfactants.

Examples of anionic surfactants include alkylbenzene sulfonates, alkyl phenyl sulfonates, alkyl naphthalene sulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates.

Examples of the dispersant further include rosin, rosin derivatives, and coupling agents.

Aqueous Medium

Examples of the aqueous medium include water (e.g., distilled water and ion exchange water) and alcohols.

The proportion of water in the aqueous medium may be 80 mass % (preferably 90 mass % or more, more preferably 100 mass %).

Amount of Each Component in Mixture A

The amount of each component in the mixture A is as described below.

The amount of the organic pigment is, for example, preferably 10 mass % or more and 40 mass % or less, more preferably 15 mass % or more and 35 mass % or less, with respect to the aqueous medium.

The amount of the flame retardant is, for example, 0.005 mass % or more and 1 mass % or less with respect to the organic pigment.

The amount of the dispersant is, for example, 5 mass % or more and 15 mass % or less with respect to the organic pigment.

The flame retardant is a component mixed with the organic pigment in advance and is measured as described below.

The type of flame retardant contained in a target sample is specified by various analyses.

Separately, samples each containing a known amount of the flame retardant specified by analysis are analyzed by X-ray fluorescence. The amounts of elements contained in the specified flame retardant are measured, and the calibration curve is produced.

The target sample is analyzed by X-ray fluorescence. The amounts of elements contained in the specified flame retardant are measured, and the amounts of components of interest are measured from the obtained amounts of elements and the calibration curve.

The method for producing a pigment dispersion according to the exemplary embodiment described above is representatively used in the method for producing a toner resin particle dispersion.

Other applications include ink-jet ink, cosmetics, powder coating materials, various coating materials, and electronic paper ink.

Method for Producing Toner

A method for producing a toner according to an exemplary embodiment includes:

a step (hereinafter an aggregated particle-forming step) of forming aggregated particles by aggregating at least resin particles and an organic pigment in a dispersion containing the resin particles and the organic pigment; and a step (hereinafter a fusing-coalescing step) of fusing and coalescing the aggregated particles by heating the aggregated particle dispersion containing the aggregated particles dispersed therein to form toner particles.

The organic pigment obtained by the method for producing a pigment dispersion according to the exemplary embodiment is used as an organic pigment.

A toner according to an exemplary embodiment is a toner having toner particles obtained by the method for producing a toner according to the exemplary embodiment.

The details of each step will be described below.

A method for producing toner particles containing an organic pigment and a release agent is described below, but the release agent is used as desired. Additives other than the release agent may be used.

Particle Dispersion-Preparing Step

In the particle dispersion-preparing step, a resin particle dispersion, a pigment dispersion, and a release agent dispersion are prepared.

The pigment dispersion is produced in accordance with the method for producing a pigment dispersion according to the exemplary embodiment. A pigment dispersion other than the pigment dispersion obtained by the method for producing a pigment dispersion according to the exemplary embodiment may be used together.

Resin Particle Dispersion

The resin particle dispersion is a dispersion containing, dispersed therein, resin particles serving as a binder resin for toner.

The resin particle dispersion is prepared by, for example, dispersing the resin particles in an aqueous medium by using a surfactant.

Examples of the resin for the resin particles include vinyl resins composed of a homopolymer of a monomer or a copolymer of two or more monomers selected from, for example, styrenes (e.g., styrene, p-chlorostyrene, α-methylstyrene), (meth)acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the resin further include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers produced by polymerization of a vinyl monomer in the presence of these non-vinyl resins.

These resins may be used alone or in combination of two or more.

The resin may be a resin having a polar group, such as carboxyl group, sulfonate group, hydroxy group, and may be a resin having an acid value.

The resin may be an amorphous resin. The resin may be a crystalline resin (e.g., crystalline polyester resin).

The term amorphous resin as used herein refers to a resin that shows only stepwise endothermic changes rather than having a distinct endothermic peak as measured by thermal analysis using differential scanning calorimetry (DSC) and that is solid at normal temperature and thermally plasticized at a temperature higher than or equal to the glass transition temperature.

The term crystalline resin refers to a resin that has a distinct endothermic peak rather than showing stepwise endothermic changes as measured by differential scanning calorimetry (DSC).

Specifically, for example, a crystalline resin means that the full width at half maximum of the endothermic peak measured at a heating rate of 10° C./min is within 10° C., and an amorphous resin means a resin having a full width at half maximum of more than 10° C. or a resin showing no distinct endothermic peak.

The amorphous resin will be described.

Examples of the amorphous resin include known amorphous resins, such as amorphous polyester resins, amorphous vinyl resins (i.e., styrene acrylic resin), epoxy resins, polycarbonate resins, and polyurethane resins. Of these resins, amorphous polyester resins and amorphous vinyl resins (particularly, styrene acrylic resin) are preferred, and amorphous polyester resins are more preferred.

In some embodiments, the amorphous resin may be a combination of an amorphous polyester resin and a styrene acrylic resin. In some embodiments, the amorphous resin may have an amorphous polyester resin segment and a styrene acrylic resin segment.

Examples of the aqueous medium include water (e.g., distilled water and ion exchange water) and alcohols.

Examples of the surfactant include anionic surfactants, such as sulfate ester salts, sulfonate salts, phosphate esters, and soaps; cationic surfactants, such as amine salts and quaternary ammonium salts; and non-ionic surfactants, such as polyethylene glycols, alkylphenol ethylene oxide adducts, and polyhydric alcohols. Of these surfactants, in particular, anionic surfactants and cationic surfactants may be used. A non-ionic surfactant may be used in combination with an anionic surfactant or a cationic surfactant.

The surfactant may be used alone or in combination of two or more.

Examples of the method for dispersing resin particles in a dispersion medium to prepare the resin particle dispersion include ordinary dispersion methods using, for example, a rotary shear homogenizer, a ball mill having media, a sand mill, and Dyno-Mill. Depending on the type of resin particles, for example, the phase-inversion emulsification method may be used to disperse resin particles in a resin particle dispersion.

The phase-inversion emulsification method is a method for dispersing a resin in the form of particles in an aqueous medium. This method involves dissolving a target resin in a hydrophobic organic solvent capable of dissolving the resin; adding a base to an organic continuous phase (O phase) to cause neutralization; and then adding an aqueous medium (W phase) to cause resin conversion (so called phase inversion) from W/O to O/W, forming a discontinuous phase.

The volume-average particle size of resin particles dispersed in the resin particle dispersion is preferably, for example, 0.01 μm or more and 1 μm or less, more preferably 0.08 μm or more and 0.8 μm or less, still more preferably 0.1 μm or more and 0.6 μm or less.

The volume-average particle size of the resin particles is determined as follows: drawing the volume-based cumulative distribution from the smallest particle size as a function of divided particle size ranges (channels) of the particle size distribution measured with a laser diffraction particle size distribution analyzer (e.g., LA-700 available from Horiba Ltd.); and defining the particle size at 50% cumulative volume with respect to all particles as a volume-average particle size D50v. The volume-average particle size of the particles in other dispersions is measured similarly.

The amount of the resin particles in the resin particle dispersion is, for example, preferably 5 mass % or more and 50 mass % or less, more preferably 10 mass % or more and 40 mass % or less.

Release Agent Particle Dispersion

A release agent particle dispersion is a dispersion containing a release agent dispersed in an aqueous medium.

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these.

The melting temperature of the release agent is preferably 50° C. or higher and 110° C. or lower, more preferably 60° C. or higher and 100° C. or lower.

The melting temperature is determined from the DSC curve obtained by differential scanning calorimetry (DSC) in accordance with "melting peak temperature" described in the method for determining the melting temperature in JIS K 7121-1987 "Testing Methods for Transition Temperatures of Plastics".

The release agent is dispersed in an aqueous medium by a known method using, for example, a rotary shear homogenizer, a media-type disperser, such as a ball mill, a sand mill, or an attritor, or a high-pressure counter collision disperser. The release agent may be dispersed in an aqueous solvent using an ionic surfactant having polarity and a homogenizer to prepare a release agent particle dispersion.

The volume-average particle size of the release agent particles is preferably 1 µm or less, more preferably 0.01 µm or more and 1 µm or less.

Aggregated Particle-Forming Step

Next, the resin particle dispersion is mixed with the pigment dispersion and the release agent particle dispersion.

The resin particles, the organic pigment, and the release agent particles cause hetero-aggregation in the mixed dispersion to form aggregated particles having a size close to the intended toner particle size and containing the resin particles, the organic pigment, and the release agent particles.

Specifically, the aggregated particles are formed, for example, as follows: adding an aggregating agent to the mixed dispersion and adjusting the pH of the mixed dispersion to the acid side (e.g., pH 2 or higher and pH 5 or lower), and adding a dispersion stabilizer as desired; and then heating the mixed dispersion to the glass transition temperature of the resin particles (specifically, for example, the glass transition temperature of the resin particles—30° C. or higher and the glass transition temperature—10° C. or lower) to cause aggregation of the particles dispersed in the mixed dispersion.

The aggregated particle-forming step may involve, for example, adding the aggregating agent to the mixed dispersion at room temperature (e.g., 25° C.) under stirring with a rotary shear homogenizer and adjusting the pH of the mixed dispersion to the acid side (e.g., pH 2 or higher and pH 5 or lower), and performing the heating described above after adding a dispersion stabilizer as desired.

Examples of the aggregating agent include surfactants having polarity opposite to the polarity of the surfactant used as a dispersant added to the mixed dispersion, inorganic metal salts, and divalent or higher valent metal complexes. In particular, the use of a metal complex as an aggregating agent may reduce the amount of the surfactant used and may improve charging characteristics.

An additive that forms a complex or a similar bond with the metal ion of the aggregating agent may be used as desired. The additive may be a chelator.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelator may be a water-soluble chelator. Examples of the chelator include oxycarboxylic acids, such as tartaric acid, citric acid, and gluconic acid; and iminodiacetic acid (IDA), nitrilotriacetic acid (NTA), and ethylenediaminetetraacetic acid (EDTA).

The total amount of the chelator added is, for example, preferably 0.01 parts by mass or more and 5.0 parts by mass or less, more preferably 0.1 parts by mass or more and less than 3.0 parts by mass, with respect to 100 parts by mass of the resin particles.

Fusing-Coalescing Step

Next, the aggregated particle dispersion containing the aggregated particles dispersed therein is heated to, for example, a temperature not lower than the glass transition temperature of the resin particles (e.g., a temperature higher than the glass transition temperature of the resin particles by 10° C. to 30° C., or higher) to cause fusion and coalescence of the aggregated particles and thus to form toner particles.

The toner particles are produced through the above-described steps.

The toner particles may be produced through the following steps: a step of preparing an aggregated particle dispersion containing aggregated particles dispersed therein, then mixing the aggregated particle dispersion and a resin particle dispersion containing resin particles dispersed therein, and causing aggregation such that the resin particles adhere to the surfaces of the aggregated particles to form secondary aggregated particles; and a step of fusing and coalescing the secondary aggregated particles into toner particles having a core-shell structure by heating a secondary aggregated particle dispersion containing the secondary aggregated particles dispersed therein.

After completion of the fusing-coalescing step, the toner particles formed in the solution are subjected to a known washing step, a known solid-liquid separation step, and a known drying step to produce dry toner particles.

The washing step may involve sufficient displacement washing with ion exchange water in view of charging characteristics. The solid-liquid separation step is not limited and may involve, for example, suction filtration or pressure filtration in view of productivity. The drying step is not limited and may involve, for example, freeze drying, flush drying, fluidized bed drying, or vibratory fluidized bed drying in view of productivity.

The toner according to the exemplary embodiment is produced by, for example, adding external additives to the obtained dry toner particles and mixing them. Mixing may be performed with, for example, a V-blender, a Henschel mixer, or a Lodige mixer. In addition, coarse toner particles may be removed with a vibratory screening machine, an air screening machine, or other machines, as desired.

Examples of external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobization is performed by, for example, dipping the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more.

The amount of the hydrophobizing agent is normally, for example, 1 part by mass or more and 10 parts by mass or less with respect to 100 parts by mass of the inorganic particles.

Examples of external additives further include resin particles (resin particles made of, for example, polystyrene, polymethyl methacrylate (PMMA), and melamine resin), and cleaning active agents (e.g., higher fatty acid metal salts, such as zinc stearate, and fluoropolymer particles).

The amount of external additives externally added is, for example, preferably 0.01 mass % or more and 5 mass % or less, more preferably 0.01 mass % or more and 2.0 mass % or less with respect to the toner particles.

EXAMPLES

Examples of the present disclosure will be described below, but the present disclosure is not limited to the following Examples. In the following description, the units "part" and "%" are both on a mass basis, unless otherwise specified.

Example 1

Production of Pigment Dispersion
  Organic pigment: Y74 available from Dainichiseika Color & Chemicals Mfg. Co., Ltd., 98 parts by mass
  Flame retardant: aluminum hydroxide (number-average particle size=80 μm), 0.1 parts by mass (flame retardant contained in organic pigment)
  Anionic surfactant (Neogen R available from DKS Co. Ltd.): 2 parts by mass
  Ion exchange water: 400 parts by mass A mixture A formed by mixing the components described above is circulated and dispersed in a first media disperser shown in FIG. 2 (modified machine of "Key Mill KMC-0.5" available from Inoue Mfg., Inc.) under the conditions shown in Table 1 to produce a mixture B in the first dispersing step.

Next, the mixture B is circulated and dispersed in a second media disperser shown in FIG. 2 (modified machine of "Key Mill KMC-0.5" available from Inoue Mfg., Inc.) under the conditions shown in Table 1 to produce a mixture C in the second dispersing step.

A pigment dispersion composed of the mixture C is produced through the above steps.

Examples 2 to 15 and Comparative Examples 1 to 5

Pigment dispersions are produced in the same manner as in Example 1 except that the conditions are changed as shown in Table 1.

In Example 7, an organic pigment contains 0.1 parts by mass of red phosphorus (number-average particle size=10 μm), instead of aluminum hydroxide, as a flame retardant.

In Example 13, first and second media dispersers modified so as to have a screen-type separator outside the cylindrical rotor are used.

In Comparative Example 4, first and second media dispersers modified so as to have a centrifugation-type separator instead of the screen-type separator are used.

In Comparative Example 5, a stirring tank-type disperser having a screen-type separator (modified machine of "DYNO-MILL ECM-AP05" Willy A. Bachofen (WAB)) is used instead of the first and second media dispersers.

Evaluation

Evaluation of Pigment Dispersibility

The volume-average particle size D50v of the organic pigment in the pigment dispersion produced in each Example is measured by the method described above. The dispersion size of the organic pigment is evaluated on the basis of the following criteria. The practically acceptable range is B or higher.

A: The dispersion size of the organic pigment is 200 nm or less.

B: The dispersion size of the organic pigment is more than 200 nm and 300 nm or less.

C: The dispersion size of the organic pigment is more than 300 nm and 700 nm or less.

D: The dispersion size of the organic pigment is more than 700 nm.

Evaluation of Flame Retardant Removability

The total amount of the pigment dispersion produced in each Example is sifted through a screen with a mesh size of 0.05 μm, and the number of particles of the flame retardant remaining on the mesh is counted by visual observation. The flame retardant removability is evaluated on the basis of the following criteria. The practically acceptable range is B or higher.

A: The number of particles of the flame retardant remaining on the screen mesh is 20 or less.

B: The number of particles of the flame retardant remaining on the screen mesh is more than 20 and 40 or less.

C: The number of particles of the flame retardant remaining on the screen mesh is more than 40 and 60 or less.

D: The number of particles of the flame retardant remaining on the screen mesh is more than 60.

Evaluation of Continuous Processing of Media Disperser

The process for producing the pigment dispersion in each Example is repeated, and the number of continuous processing until blockage occurs in the screen-type separator of the media disperser is evaluated. Specifically, a pressure gauge is set just in front of the mixture supply port in the media disperser. When the gauge pressure increases to 0.5 MPa, it is determined that blockage occurs in the screen-type separator due to clogging with the flame retardant.

The continuous processing is evaluated on the basis of the following criteria. The number of continuous processing until blockage occurs in the screen-type separator in any one of the first media disperser in the first dispersing step and the second media disperser in the second dispersing step is used for evaluation. The practically acceptable range is B or higher.

A: The number of continuous processing is 20 times or more.

B: The number of continuous processing is 10 times or more and less than 20 times.

C: The number of continuous processing is 5 times or more and less than 10 times.

D: The number of continuous processing is less than 5 times.

The results are shown in Table 1.

The details of abbreviations or the like in Table 1 are as described below.

First-stage media diameter MA: the number-average particle size MA of the media particles in the first media disperser in the first dispersing step.

Second-stage media diameter MB: the number-average particle size MB of the media particles in the second media disperser in the second dispersing step.

Screen-type separator mesh size (ratio of mesh size to MA and MB): the screen-type separator mesh size expressed by the ratio of the mesh size to the number-average particle sizes MA and MB of the media particles in the first and second media dispersers

TABLE 1-1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Flame retardant | Type | aluminum hydroxide | aluminum hydroxide | aluminum hydroxide | aluminum hydroxide | aluminum hydroxide | aluminum hydroxide | red phosphorus | aluminum hydroxide | aluminum hydroxide | aluminum hydroxide |
| Media disperser | Type | annular type | annular type | annular type | annular type | annular type | annular type | annular type | annular type | annular type | annular type |
| Media separator | Type | screen type | screen type | screen type | screen type | screen type | screen type | screen type | screen type | screen type | screen type |
| First-stage media diameter MA | mm | 0.5 | 0.1 | 0.4 | 0.2 | 0.5 | 0.4 | 0.4 | 0.5 | 0.5 | 0.5 |
| Second-stage media diameter MB | mm | 0.3 | 0.05 | 0.2 | 0.1 | 0.05 | 0.1 | 0.1 | 0.3 | 0.3 | 0.3 |
| MB-MA | mm | 0.20 | 0.05 | 0.20 | 0.10 | 0.45 | 0.30 | 0.30 | 0.20 | 0.20 | 0.20 |
| Position of screen-type separator |  | inside cylindrical rotor | inside cylindrical rotor | inside cylindrical rotor | inside cylindrical rotor | inside cylindrical rotor | inside cylindrical rotor | inside cylindrical rotor | inside cylindrical rotor | inside cylindrical rotor | inside cylindrical rotor |
| Screen-type separator mesh size (ratio of mesh size to MA and MB) |  | 1/2 | 1/2 | 1/2 | 1/2 | 1/2 | 1/2 | 1/2 | 1/3 | 1/2 | 1/2 |
| BD/RD |  | 1.2 | 1.2 | 1.2 | 1.2 | 1.2 | 1.2 | 1.2 | 1.2 | 1.5 | 1.05 |
| Peripheral speed of cylindrical rotor | m/s | 12 | 12 | 12 | 12 | 12 | 12 | 12 | 2 | 12 | 12 |
| Residence time RT (=V/v × t) | min | 1.5 | 1.5 | 1.5 | 1.5 | 1.5 | 1.5 | 1.5 | 1.5 | 1.5 | 1.5 |
| Pigment dispersibility |  | B | A | A | A | A | A | A | B | B | A |
| Flame retardant removability |  | B | A | A | A | A | A | A | A | A | A |
| Continuous processing |  | A | B | A | A | B | A | A | A | A | A |

TABLE 1-2

|  |  | Example 11 | Example 12 | Example 13 | Example 14 | Example 15 | Comparative Example 1 | Comparative Example 2 | Comparative Example 3 | Comparative Example 4 | Comparative Example 5 |
|---|---|---|---|---|---|---|---|---|---|---|---|
| Flame retardant | Type | aluminum hydroxide | aluminum hydroxide | aluminum hydroxide | aluminum hydroxide | aluminum hydroxide | aluminum hydroxide | aluminum hydroxide | aluminum hydroxide | aluminum hydroxide | aluminum hydroxide |
| Media disperser | Type | annular type | annular type | annular type | annular type | annular type | annular type | annular type | annular type | screen type | stirring tank type |
| Media separator | Type | screen type | screen type | screen type | screen type | screen type | screen type | screen type | screen type | centrifugation type | screen type |
| First-stage media diameter MA | mm | 0.5 | 0.5 | 0.5 | 0.5 | 0.5 | 0.7 | 0.5 | 0.1 | 0.4 | 0.4 |
| Second-stage media diameter MB | mm | 0.3 | 0.3 | 0.3 | 0.3 | 0.3 | 0.1 | 0.4 | 0.1 | 0.1 | 0.1 |

TABLE 1-2-continued

| | | Example 11 | Example 12 | Example 13 | Example 14 | Example 15 | Comparative Example 1 | Comparative Example 2 | Comparative Example 3 | Comparative Example 4 | Comparative Example 5 |
|---|---|---|---|---|---|---|---|---|---|---|---|
| MB-MA | mm | 0.20 | 0.20 | 0.20 | 0.20 | 0.20 | 0.60 | 0.10 | 0.00 | 0.30 | 0.30 |
| Position of screen-type separator | | inside rotor cylindrical | inside rotor cylindrical | outside rotor cylindrical | inside rotor cylindrical | inside rotor cylindrical | inside cylindrical rotor | inside cylindrical rotor | inside cylindrical rotor | — | — |
| Screen-type separator mesh size (ratio of mesh size to MA and MB) | | 1/2 | 1/2 | 1/2 | 1/2 | 1/2 | 1/2 | 1/2 | 1/2 | — | 1/2 |
| BD/RD | | 1.2 | 1.2 | 1.2 | 1.2 | 1.2 | 1.2 | 1.2 | 1.2 | 1.2 | — |
| Peripheral speed of cylindrical rotor | m/s | 15 | 9 | 9 | 9 | 9 | 12 | 12 | 12 | 12 | 12 (peripheral speed of blade) |
| Residence time RT (=V/v × t) | min | 1.5 | 1.5 | 1.5 | 0.5 | 3 | 1.5 | 1.5 | 1.5 | 1.5 | 1.5 |
| Pigment dispersibility | | A | B | A | B | A | A | C | A | A | C |
| Flame retardant removability | | A | A | A | A | A | A | C | A | D | A |
| Continuous processing | | A | A | B | A | A | C | A | D | A | A |

The above results indicate that, in the methods for producing pigment dispersions in Examples, the pigment has high dispersibility, and the screen-type media separator of the media disperser is prevented from being clogged with the flame retardant, compared with the methods for pigment dispersions in Comparative Examples. It is also found that the flame retardant removability is high.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a pigment dispersion, the method comprising:
    wet-dispersing a mixture A containing an organic pigment, a flame retardant, a dispersant, and an aqueous medium by using a media disperser to form a mixture B; and
    wet-dispersing the mixture B by using a media disperser to form a mixture C,
    wherein the media disperser in the wet-dispersing of the mixture A and the media disperser in the wet-dispersing of the mixture B are annular-type media dispersers each having a cylindrical vessel, a cylindrical rotor that is disposed inside the cylindrical vessel and that rotates to disperse the mixture, and a screen-type media separator that separates media particles and the mixture, and
    a number-average particle size MA of the media particles in the media disperser in the wet-dispersing of the mixture A and a number-average particle size MB of the media particles in the media disperser in the wet-dispersing of the mixture B satisfy the following formula (1) and the following formula (2):

$0.5 \text{ mm} \geq MA > MB \geq 0.05 \text{ mm}$, Formula (1):

$0.3 \text{ mm} \geq MB \geq 0.05 \text{ mm}$. Formula (2).

2. The method for producing a pigment dispersion according to claim 1, wherein the number-average particle size MA of the media particles in the media disperser in the wet-dispersing of the mixture A and the number-average particle size MB of the media particles in the media disperser in the wet-dispersing of the mixture B satisfy the following formula (11) and the following formula (21):

$0.4 \text{ mm} \geq MA > MB \geq 0.1 \text{ mm}$, Formula (11):

$0.2 \text{ mm} \geq MB \geq 0.1 \text{ mm}$. Formula (21).

3. The method for producing a pigment dispersion according to claim 1, wherein the number-average particle size MA of the media particles in the media disperser in the wet-dispersing of the mixture A and the number-average particle size MB of the media particles in the media disperser in the wet-dispersing of the mixture B satisfy the following formula (3):

$0.45 \text{ mm} \geq MA - MB \geq 0.05 \text{ mm}$. Formula (3).

4. The method for producing a pigment dispersion according to claim 3, wherein the number-average particle size MA of the media particles in the media disperser in the wet-dispersing of the mixture A and the number-average particle size MB of the media particles in the media disperser in the wet-dispersing of the mixture B satisfy the following formula (31):

$0.3 \text{ mm} \geq MA - MB \geq 0.1 \text{ mm}$. Formula (31).

5. The method for producing a pigment dispersion according to claim 1, wherein the flame retardant is a metal hydroxide.

6. The method for producing a pigment dispersion according to claim 1, wherein a ratio of a mesh size of the screen-type media separator of the media disperser to the number-average particle size of the media particles of the media disperser in the wet-dispersing of the mixture A and the wet-dispersing of the mixture B is 1/3 or higher and 1/2 or lower.

7. The method for producing a pigment dispersion according to claim 1, wherein an inner diameter BD of the cylindrical vessel and an outer diameter RD of the cylindrical rotor in each of the media dispersers in the wet-dispersing of the mixture A and the wet-dispersing of the mixture B satisfy the following formula (4):

$$1.50 \geq BD/RD \geq 1.05. \quad \text{Formula (4)}.$$

8. The method for producing a pigment dispersion according to claim 7, wherein a peripheral speed of the cylindrical rotor is 9 m/s or higher and 20 m/s or lower.

9. The method for producing a pigment dispersion according to claim 1, wherein the screen-type media separator is disposed inside the cylindrical rotor in each of the media dispersers in the wet-dispersing of the mixture A and the wet-dispersing of the mixture B.

10. The method for producing a pigment dispersion according to claim 1, wherein each of the media dispersers in the wet-dispersing of the mixture A and the wet-dispersing of the mixture B is a disperser that circulates the mixture to form a dispersion, and when an effective volume of the media disperser is represented by V, a volume of the mixture dispersed by the media disperser is represented by v, and an operation time is represented by t, a residence time RT ($=V/v \times t$) during which the mixture resides in the media disperser is 0.5 minutes or longer and 3 minutes or shorter.

11. A method for producing a toner for developing electrostatic charge images, the method comprising:

in a dispersion containing resin particles and an organic pigment in a pigment dispersion produced by the method for producing a pigment dispersion according to claim 1, forming aggregated particles by aggregating at least the resin particles and the organic pigment; and fusing and coalescing the aggregated particles by heating an aggregated particle dispersion containing the aggregated particles dispersed therein to form toner particles.

* * * * *